United States Patent

Fleissner

[15] 3,690,186
[45] Sept. 12, 1972

[54] PROJECTOR FOR PHOTOGRAPHIC TRANSPARENCIES

[72] Inventor: Josef Fleissner, Kirchseeon, Germany

[73] Assignee: Afga-Gevaert Aktiengesellschaft, Leverkusen, Germany

[22] Filed: March 20, 1970

[21] Appl. No.: 21,417

[30] Foreign Application Priority Data

March 21, 1969 Germany ........G 69 11 413.2

[52] U.S. Cl. ...................................353/103
[51] Int. Cl. ............................................G03b 23/00
[58] Field of Search ..........................353/103–117; 40/79; 74/89.1, 422

[56] References Cited

UNITED STATES PATENTS 3,165,971  1/1965  Zillmer..........................40/79
3,059,360  10/1962  Krauskoff..................353/116
3,473,871  10/1969  Hofmann....................353/116

Primary Examiner—Leonard Forman
Assistant Examiner—A. J. Mirabito
Attorney—Michael S. Striker

[57] ABSTRACT

A slide projector wherein the slide changer carries a two-armed lever which tends to resist pivotal movement and rotates a wheel to thereby index the magazine for slides while the slide changer continues to move upon completed return of a slide into the respective compartment. An adjustable selector can pivot the lever from a neutral position to one of two operative positions in which the lever respectively rotates the wheel in a clockwise and in a counterclockwise direction (forward and backward transport of the magazine). A resetting member pivots the lever to neutral position upon completion of each indexing step. The selector cooperates with cam faces on one arm and the resetting member cooperates with extensions on the other arm of the lever.

9 Claims, 3 Drawing Figures 3,690,186

INVENTOR.
JOSEF FLEISSNER
BY Michael S. Striker
Attorney 3,690,186

PROJECTOR FOR PHOTOGRAPHIC TRANSPARENCIES

BACKGROUND OF THE INVENTION

The present invention relates to projectors for photographic transparencies or slides in general, and more particularly to improvements in projectors of the type wherein the slide changer effects stepwise forward or rearward indexing of the magazine for slides in response to movement of a slide from projection position back into the corresponding compartment of the magazine.

In certain presently known slide projectors of the just outlined type, the slide changer carries a pivotable displacing arm which is biased to a neutral position and includes a follower which can track the groove of an adjustable cam so as to index the magazine forwardly or backwards, depending on the position of the cam. Since the arm is permanently biased to neutral position, the length of grooves in the cam must be such that the follower is positively guided during the entire return stroke of the slide changer. Therefore, such slide changers do not permit manual displacement of the magazine at a time when the slide changer dwells in that position in which it is ready to transport a fresh slide into registry with the optical system of the projector.

SUMMARY OF THE INVENTION

An object of the invention is to provide a slide projector wherein a circular or elongated slide magazine can be rotated or moved lengthwise independently of the slide changer when the latter is ready to transport a slide to projection position.

Another object of the invention is to provide a slide projector with a novel indexing mechanism for the magazine and with novel means for selecting the direction of movement of the magazine in response to manipulation of the slide changer.

A further object of the invention is to provide a projector wherein the slide changer can be moved back and forth without causing movements of slides to and from positions of registry with the optical system.

An additional object of the invention is to provide a projector wherein the mechanism which indexes the magazine forwardly or backwards occupies little room and comprises a small number of simple and rugged parts.

Still another object of the invention is to provide a projector wherein the indexing mechanism is capable of indexing a circular or an elongated tray for photographic transparencies.

The invention is embodied in a projector which comprises a slide changer movable between first and second positions, an indexible member arranged to move the magazine forwardly or backwards in response to rotation in first and second directions, a displacing member mounted on the slide changer for movement — in response to application of a predetermined minimum force — between a first operative position in which it rotates the indexible member in the first direction, a neutral position in which it bypasses the indexible member, and a second operative position in which it rotates the indexible member in the second direction in response to movement of the slide changer, selector means which is adjustable to effect movement of the displacing member to a desired one of its operative positions in response to movement of the slide changer, and resetting means for moving the displacing member to neutral position in response to movement of the slide changer.

The arrangement is preferably such that the displacing member first engages with and is moved to one of its operative positions by the selector means, that the displacing member thereupon rotates the indexing member in the desired direction, and that the displacing member thereupon engages with and is moved to neutral position by the resetting means in response to movement of the slide changer in a direction to return a slide into the corresponding compartment of the magazine.

The novel features which are considered a characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
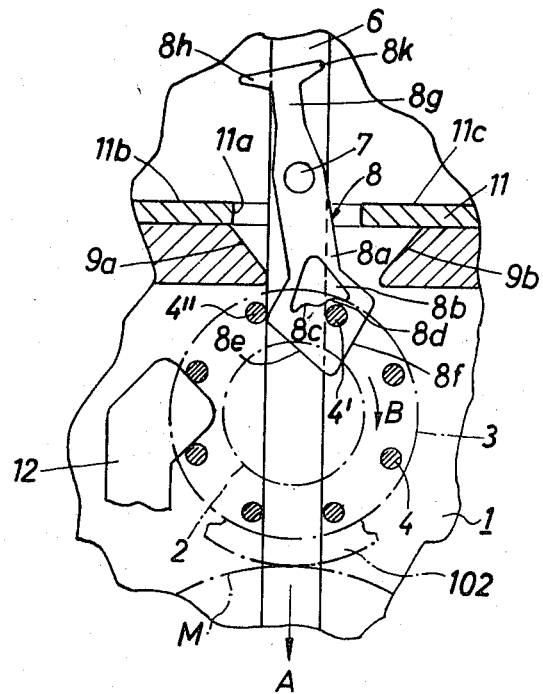
FIG. 1 is a fragmentary partly elevational and partly sectional view of certain details in a slide projector which embodies the invention.

The drawing illustrates a portion of a projector having a housing 1 which supports or accommodates an indexible magazine or tray M for photographic transparencies or slides (not shown). The means for indexing the magazine M in a clockwise or counterclockwise direction comprises a shaft 2 which is rotatably journalled in the housing 1 and carries an indexing member or wheel 3 provided with a set of equidistant axially parallel indexing projections or pins 4. The shaft 2 further carries a gear 102 which meshes with a gear provided on the magazine M. In the illustrated embodiment, the magazine is a rotary tray having radially extending slide compartments, but it is equally possible to employ the gear 102 as a means for moving a straight magazine with parallel compartments for slides.

The means for rotating the wheel 3 comprises a reciprocable slide changer 6 and a displacing member here shown as a two-armed lever 8 which is secured to the slide changer by a pivot pin 7 so that it can turn in a plane which is parallel to the plane of the wheel 3. The slide changer 6 is movable between a first position in which it maintains a slide in registry with the optical system of the projector so that the image of such slide is visible on a screen, and a second position in which the slide is returned into the corresponding compartment of the magazine M. The direction in which the slide changer 6 moves from first to second position is indicated by arrow A.

The lever 8 has a first arm 8a which carries a motion transmitting block 8b serving to cooperate with the pins 4 and provided with two notches 8c, 8d. The arm 8a is further provided with two mirror symmetrical cam faces 8e, 8f which can cooperate with cam faces 9a, 9b of an adjustable selector 9. The latter is provided with a manually movable adjusting knob 10 and is mounted in the housing 1 in such a way that it requires a certain force to move it between two spaced positions including the one shown in FIGS. 1–2 and another in which the cam faces 9a, 9b are located to the left of the positions shown in FIGS. 1–2. The means for producing friction between the housing 1 and selector 9 may include a suitable spring, elastic cushion or the like. A spring 7a or the like is provided to oppose accidental pivotal movement of the lever 8 about the axis of the pivot 7, i.e., the lever 8 and selector 9 respectively tend to resist movement with reference to the slide changer 6 and housing 1.

The second arm 8g of the lever 8 is provided with two portions or extensions 8h, 8k which can engage the adjacent guide faces 11b, 11c of a plate-like resetting member 11 adjacent to the slide 9. The resetting member 11 has an aperture 11a which registers with the aperture of the selector 9 (such aperture is flanked by the cam faces 9a, 9b). The aperture 11a is flanked by the guide faces 11b, 11c. The apertures of the selector 9 and resetting member 11 permit unimpeded reciprocatory movements of the slide changer 6.

The projector is further provided with a detent means for yieldably holding the indexing wheel 3 in such positions in which the slides in selected compartments of the magazine M are located in the path of movement of the slide changer 6. Such detent means includes a spring-biased pawl 12 whose pallet normally extends into the space between and engages with the two adjoining pins 4.

Figure 2:
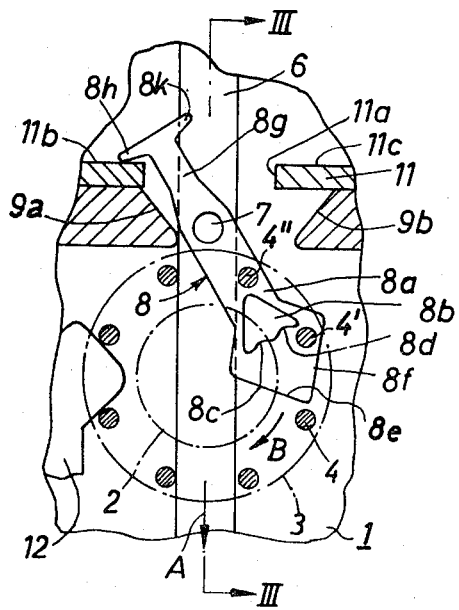
FIG. 2 shows the structure of FIG. 1 but with the slide changer, displacing member and indexing member in a different position.
Figure 3:
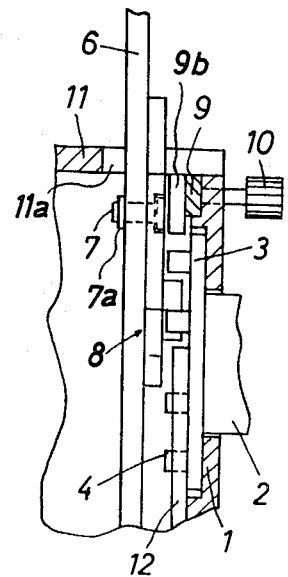
FIG. 3 is a sectional view as seen in the direction of arrows from the line III—III of FIG. 2.

The Operation:

FIGS. 1 and 2 illustrate the selector 9 in a position in which it causes the lever 8 to rotate the wheel 3 in a clockwise direction as indicated by the arrow B (forward transport of the magazine M). When the slide changer 6 is moved in the direction of arrow A to transport a slide back into the corresponding compartment of the magazine M, the cam face 8e on the arm 8a engages the cam face 9a of the selector 9 and causes the lever 8 to pivot in a counterclockwise direction so that the notch 8d moves toward engagement with the adjacent pin 4' (located to the right of the section line III—III shown in FIG. 2). Further movement of the slide changer 6 in the direction of arrow A (after the slide is returned into the corresponding compartment) causes the block 8b to rotate the wheel 3 in a clockwise direction whereby the wheel displaces the detent pawl 12 and places the next slide into registry with the slide changer 6. Just before the slide changer 6 completes its movement in the direction of arrow A, the extension 8h engages the adjacent guide face 11b of the resetting member 11 and pivots the lever 8 in a clockwise direction so that the block 8b is disengaged from the pin 4'. The pallet of the detent pawl 12 snaps into the space between the adjoining pins 4 and holds the wheel 3 in an angular position in which the next slide is ready to be withdrawn from its compartment as soon as the slide changer 6 beings its movement in the opposite direction.

The selector 9 is movable to a median or ineffective position in which the block 8b can bypass the pins 4 when the slide changer 6 moves in the direction indicated by arrow A. The slide changer 6 is then ineffective and cannot transport slides to and from the position of registry with the optical system.

FIG. 2 illustrates the wheel 3 in the new angular position (consider the positions of pin 4' in FIGS. 1 and 2). Further movement of slide hanger 6 in the direction of arrow A causes the guide face 11b and extension 8h to pivot the lever 8 so that the block 8b is disengaged from the pin 4'. This enables the operator to index the magazine M at will while the slide changer 6 dwells in its second position. Return movement of the slide changer 6 to first position causes the resetting member 11 to pivot the lever 8 clockwise so that the cam face 8e reengages the cam face 9a when the slide changer 6 performs the next movement in the direction of arrow A. This insures that the notch 8d engages the next pin 4" and indexes the wheel 3 in a clockwise direction.

If the magazine M is to be moved rearwardly, the operator manipulates the knob 10 to move the selector 9 in a direction to the left, as viewed in FIG. 1 or 2, so that the cam face 8f cooperates with the cam face 9b and the block 8b rotates the wheel 3 in a counterclockwise direction whenever the slide changer 6 moves in the direction of arrow A.

The selector 9 replaces the conventional grooved cam which guides the follower of the displacing member in presently known slide projectors. It will be seen that the selector 9 engages with the lever 8 only during a relatively short stage of movement of the slide changer 6 toward the position in which the slide changer is ready to withdraw a fresh slide. The spring 7a insures that a predetermined minimal force must be applied in order to move the lever 8 between its neutral position and the two operative positions. Thus, the lever 8 does not tend to move toward its neutral position; such movement is effected by the guide face 11b or 11c of the resetting member 11 while the lever 8 continues to move in the direction indicated by the arrow A. The arrangement is such that, when the slide changer 6 is moved to return a slide into the magazine M, the cam face 8e or 8f engages the cam face 9a or 9b to pivot the lever 8 to one of its operative positions, the notch 8d or 8c then engages with a pin 4 to rotate the wheel 3 and to index the magazine M when the slide returns into its compartment, and that the extension 8h or 8k thereupon engages the guide face 11b or 11c to return the lever 8 to neutral position in which the block 8b permits manual indexing and/or insertion or withdrawal of the magazine M against the opposition of the spring which biases the detent pawl 12. The block 8b is then located within the area surrounded by the pins 4.

When the slide changer 6 is moved upwardly from the position shown in FIG. 2, the cam face 8e clears the cam face 9a but the right-hand portion of the enlarged lower end of the arm 8a engages the resetting member 11 (at the right-hand side of the aperture 11a) to pivot the lever 8 in a clockwise direction so that the arm 8a can pass through the aperture 11a. When the slide changer 6 again moves in the direction of the arrow A, the lower end of the arm 8a can pass through the aperture 11a but the cam face 8e engages the cam face 9a (which is nearer to the center of the aperture 11a ) and pivots the lever 8 back to the operative position shown in FIG. 1. Further downward movement of the slide changer 6 then causes the wheel 3 to rotate in the direction indicated by the arrow B. The magazine M can be indexed against the opposition of the pawl 12 when the slide changer 6 is in the upper end position, i.e., when the arm 8 a of the lever 8 is located above the aperture in the selector 9. When the lower end of the arm 8a passes through the aperture 11a, the lever 8 is at least substantially parallel to the slide changer 6.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a projector for slides which are stored in an indexible magazine, a combination comprising a slide changer movable in at least one first direction between first and second positions; a rotary indexible member having an axis of rotation and arranged to move the magazine forwardly and backwards in response to rotation of said indexible member about said axis in first and second directions; a displacing member mounted on said slide changer for movement in at least one second direction with reference to said slide changer — in response to the application of a predetermined minimum force — between a first operative position in which it rotates said indexible member in said first direction, a neutral position in which it bypasses said indexible member, and a second operative position in which it rotates said indexible member in said second direction in response to movement of said slide changer, said displacing member being arranged to share the movements of said slide changer in said first direction; selector means adjustable to effect the movement of said displacing member to a desired one of said operative positions by applying said force to said displacing member in response to movement of said slide changer; resetting means located in the path of movement of said displacing member and arranged to move said displacing member to said neutral position in response to movement of said slide changer; and means for mounting said displacing member on said slide changer so that said displacing member normally tends to maintain any one of said positions thereof with reference to said slide changer.

2. In a projector for slides which are stored in an indexible magazine, a combination comprising a slide changer movable in at least one direction between first and second positions and through an intermediate position and being arranged to transport a slide into the magazine during movement from said first to said intermediate position; a rotary indexible member having an axis of rotation and arranged to move the magazine forwardly and backwards in response to rotation of said indexible member about said axis in first and second directions; a displacing member comprising a lever pivotable on said slide changer — in response to the application of a predetermined minimum force — between a first operative position in which it rotates said indexible member in said first direction during movement of said slide changer from said intermediate toward said second position thereof, a neutral position in which it bypasses said indexible member, and a second operative position in which it rotates said indexible member in said second direction in response to movement of said slide changer from said intermediate to said second position thereof, said lever being arranged to share the movement of said slide changer in said one direction and having a first arm comprising two first cam faces and a second arm comprising first and second portions; selector means adjustable to effect the movement of said lever to a desired one of said operative positions by applying said force to said lever in response to movement of said slide changer from said first position, said selector means comprising two second cam faces and being movable to a first position in which one of said second cam faces cooperates with one of said first cam faces to move to said lever to said first operative position and said selector means being further movable to a second position in which the other of said second cam faces cooperates with the other of said first cam faces to move said lever to said second operative position; and resetting means located in the path of movement of said lever and arranged to move said lever to said neutral position, said resetting means comprising first and second guide faces respectively engaging said first and second portions of said second arm to effect the movement of said lever to said neutral position when said slide changer moves from said intermediate toward said second position thereof and said lever respectively dwells in said first and second operative positions.

3. A combination as defined in claim 1, wherein said selector means is arranged to move said displacing member to selected operative position only during movement of said slide changer from said first toward said second position, said slide changer being arranged to withdraw slides from the magazine during movement from said second toward said first position thereof.

4. A combination as defined in claim 1, wherein said resetting means is provided with an aperture for said slide changer and for said displacing member in the neutral position of said displacing member.

5. A combination as defined in claim 1, wherein said displacing member comprises a lever which is pivotable with reference to said slide changer, said lever having a first arm which cooperates with said selector means and a second arm cooperating with said resetting means.

6. A combination as defined in claim 5, wherein said first arm comprises two first cam faces and said selector means comprises two second cam faces, said selector means being movable to a first position in which one of said second cam faces cooperates with one of said first cam faces to move said displacing member to first operative position, and to a second position in which the other second cam face cooperates with the other first cam face to move the displacing member to said second operative position in response to movement of said slide changer.

7. A combination as defined in claim 1, wherein said selector means is adjustable transversely of said slide changer and is provided with manually operable adjusting means.

8. A combination as defined in claim 1, wherein said slide changer is reciprocable between said first and second positions and said displacing member is arranged to engage first with said selector means, thereupon with said indexible member and finally with said resetting means in response to movement of said slide changer from first toward second position.

9. A combination as defined in claim 1, wherein said indexing member comprises a wheel having a plurality of equidistant projections one of which is located in the path of movement of said displacing member whenever the latter dwells in one of said operative positions and while said slide changer moves from said first toward said second position thereof.

* * * * *